United States Patent
Uchidiuno et al.

(10) Patent No.: US 10,275,369 B2
(45) Date of Patent: Apr. 30, 2019

(54) COMMUNICATION MODE CONTROL FOR WEARABLE DEVICES

(71) Applicant: International Business Machines Corporation, Armonk, NY (US)

(72) Inventors: Judith O. Uchidiuno, Catonsville, MD (US); Xiying Wang, Ithaca, NY (US); Justin D. Weisz, Stamford, CT (US)

(73) Assignee: International Business Machines Corporation, Armonk, NY (US)

(*) Notice: Subject to any disclaimer, the term of this patent is extended or adjusted under 35 U.S.C. 154(b) by 537 days.

(21) Appl. No.: 14/665,162

(22) Filed: Mar. 23, 2015

(65) Prior Publication Data

US 2016/0283412 A1 Sep. 29, 2016

(51) Int. Cl.
*G06F 13/12* (2006.01)
*G06F 13/38* (2006.01)
(Continued)

(52) U.S. Cl.
CPC .............. *G06F 13/102* (2013.01); *G06F 1/32* (2013.01); *G06F 1/3206* (2013.01);
(Continued)

(58) Field of Classification Search
None
See application file for complete search history.

(56) References Cited

U.S. PATENT DOCUMENTS 6,470,457 B1* 10/2002 Brewer .................... G06F 1/26
713/2
7,136,909 B2* 11/2006 Balasuriya ............. G06F 3/038
709/220
(Continued)

FOREIGN PATENT DOCUMENTS

CN 1573725 A 2/2005
CN 1610892 A 4/2005
(Continued)

OTHER PUBLICATIONS

Disclosed Anonymously, "A method for wearable devices user interaction", An IP.com Prior Art Database Technical Disclosure, IP.com No. 000234134, Jan. 14, 2014, pp. 1-7.
(Continued)

*Primary Examiner* — Elias Mamo
(74) *Attorney, Agent, or Firm* — Andrew Aubert (57) ABSTRACT

A method, executed by one or more processors, includes monitoring a plurality of ambient condition sensors configured to sense a plurality of ambient conditions that are relevant to a plurality of communication modes provided by at least one user I/O device, deactivating a first communication mode of the plurality of communication modes and activating a second communication mode of the plurality of communication modes in response to determining, via the plurality of ambient condition sensors, that one or more of the plurality of ambient conditions are not conducive to the first communication mode and that the plurality of ambient conditions are collectively more conducive to the second communication mode than the first communication mode. A corresponding apparatus and computer program product are also disclosed herein.

17 Claims, 5 Drawing Sheets

(51) Int. Cl.
*G06F 13/10* (2006.01)
*G06F 3/0484* (2013.01)
*G06F 3/16* (2006.01)
*G06F 3/0488* (2013.01)
*G06F 1/32* (2019.01)
*G06F 3/038* (2013.01)
*G06F 1/3206* (2019.01)
*G06F 1/3231* (2019.01)
*G06F 1/3234* (2019.01)

(52) U.S. Cl.
CPC .......... *G06F 1/3231* (2013.01); *G06F 1/3265* (2013.01); *G06F 1/3278* (2013.01); *G06F 3/038* (2013.01); *G06F 3/0484* (2013.01); *G06F 3/0488* (2013.01); *G06F 3/167* (2013.01); *Y02D 10/14* (2018.01)

(56) References Cited

U.S. PATENT DOCUMENTS

| | | | | |
|---|---|---|---|---|
| 8,547,907 | B2* | 10/2013 | Pelton | H04W 4/001 370/328 |
| 8,670,222 | B2 | 3/2014 | Rothkopf | |
| 2010/0075652 | A1* | 3/2010 | Keskar | H04M 1/72569 455/418 |
| 2011/0050428 | A1* | 3/2011 | Istoc | G06F 19/345 340/573.1 |
| 2012/0034904 | A1* | 2/2012 | LeBeau | G10L 15/265 455/414.1 |
| 2012/0159139 | A1* | 6/2012 | Kim | H04M 1/72563 713/2 |
| 2012/0206335 | A1 | 8/2012 | Osterhout et al. | |
| 2013/0154838 | A1 | 6/2013 | Alameh et al. | |
| 2014/0181715 | A1* | 6/2014 | Axelrod | G06F 3/0487 715/771 |
| 2014/0257819 | A1* | 9/2014 | Li | G06F 1/1694 704/260 |
| 2014/0266988 | A1 | 9/2014 | Fisher et al. | |
| 2014/0292210 | A1* | 10/2014 | Clauberg | H05B 37/0254 315/159 |
| 2015/0302301 | A1* | 10/2015 | Petersen | G06Q 10/107 706/11 |

FOREIGN PATENT DOCUMENTS

| | | |
|---|---|---|
| CN | 102566884 A | 7/2012 |
| CN | 103282957 A | 9/2013 |
| CN | 103309226 A | 9/2013 |
| KR | 1020140097742 A | 8/2014 |
| WO | 2014144940 A2 | 9/2014 |

OTHER PUBLICATIONS

Jalaliniya, Shahram, "Towards Dynamically Switching Multimodal User Interfaces: An Architecture for Wearable Computers & A First Experiment", A thesis submitted in partial fulfillment fulfillment of the requirements for the degree of Master of Science, Jan. 2014, IT University of Copenhagen, © 2014 by Shahram Jalaliniya, pp. 1-77.
Mann, Steve, "'Smart Clothing': Wearable Multimedia Computing and 'Personal Imaging' to Restore the Technological Balance Between People and Their Environment", ACM Multimedia 96, Boston, MA USA, @1996 ACM 0-89791-871-1/96/11, pp. 163-174.

* cited by examiner

| | | | | 1 | 2 | 3 | 4 | 5 | 6 | 7 | 8 | 9 | 10 |
|---|---|---|---|---|---|---|---|---|---|---|---|---|---|
| CONDUCIVE COMMUNICATION MODES | VISUAL | IN | VIDEO RECORDING | Y | Y | N | Y | Y | N | N | - | - | - |
| | | | CAMERA | Y | Y | N | Y | Y | N | N | - | - | - |
| | | OUT | BACKLIT TEXT DISPLAY | Y | Y | Y | - | - | - | - | - | - | - |
| | | | TEXT DISPLAY | Y | N | N | - | - | - | - | - | - | - |
| | | | GRAPHICS DISPLAY | Y | N | N | - | - | - | - | - | - | - |
| | | | VIDEO PLAYBACK | Y | N | Y | - | - | - | - | - | - | - |
| | TACTILE | IN | VIRTUAL KEYBOARD | - | - | - | Y | N | N | N | - | - | - |
| | | | TOUCHSCREEN GESTURES | - | - | - | Y | N | N | N | - | - | - |
| | | | TOUCHSCREEN MENUS | - | - | - | Y | Y | Y | Y | - | - | - |
| | | OUT | VIBRATION | - | - | - | Y | Y | Y | Y | - | - | - |
| | AURAL | IN | HEADSET MICROPHONE | - | - | - | - | - | - | - | Y | Y | N |
| | | | AMBIENT MICROPHONE | - | - | - | - | - | - | - | Y | N | N |
| | | OUT | ALARMS | - | - | - | - | - | - | - | Y | Y | N |
| | | | EARPIECE OR HEADPHONES | - | - | - | - | - | - | - | Y | Y | N |
| | | | SPEAKER | - | - | - | - | - | - | - | Y | N | N |
| AMBIENT CONDITION | LIGHTING | | BRIGHT | N | Y | N | - | - | - | - | - | - | - |
| | | | DARK | N | N | Y | - | - | - | - | - | - | - |
| | MOTION | | IN MOTION | - | - | - | N | Y | N | Y | - | - | - |
| | | | SHAKY | - | - | - | N | N | Y | Y | - | - | - |
| | NOISE | | MODERATELY NOISY | - | - | - | - | - | - | - | N | Y | Y |
| | | | EXTREMELY NOISY | - | - | - | - | - | - | - | N | N | Y |

| COMMUNICATION MODE | USER I/O DEVICE(S) | | | | | | POWER USAGE |
|---|---|---|---|---|---|---|---|
| | CAMERA | DISPLAY | TOUCHSCREEN | VIBRATOR | AUDIO IN | AUDIO OUT | |
| VIDEO RECORDING | X | | | | | | MEDIUM |
| CAMERA | X | | | | | | LOW |
| BACKLIT TEXT DISPLAY | | X | | | | | HIGH |
| TEXT DISPLAY | | X | | | | | MEDIUM |
| GRAPHICS DISPLAY | | X | | | | | MEDIUM |
| VIDEO PLAYBACK | | X | | | | | HIGH |
| VIRTUAL KEYBOARD | | X | X | | | | LOW |
| TOUCHSCREEN MENUS | | X | X | | | | LOW |
| TOUCHSCREEN GESTURES | | | X | | | | LOW |
| VIBRATION | | | | X | | | MEDIUM |
| HEADSET MICROPHONE | | | | | X | | LOW |
| AMBIENT MICROPHONE | | | | | X | | LOW |
| ALARMS | | | | | | X | LOW |
| EARPIECE OR HEADPHONES | | | | | | X | LOW |
| SPEAKER | | | | | | X | MEDIUM |

COMMUNICATION MODE CONTROL FOR WEARABLE DEVICES

BACKGROUND OF THE INVENTION

The present invention relates generally to wearable computing devices and specifically to managing user interactions and power consumption within such devices in diverse communication environments.

Wearable computing devices are clothing or accessories that incorporate computing devices. The wearable computing devices may be used to access information or communicate with other users. Since the devices are worn, they are often subject to a wide variety of environments that may be harsh and are often dynamic.

SUMMARY

A method, executed by one or more processors, includes monitoring an ambient condition sensor configured to sense an ambient condition that is relevant to a plurality of communication modes provided by at least one user I/O device, deactivating a first communication mode of the plurality of communication modes and activating a second communication mode of the plurality of communication modes in response to determining, via the ambient condition sensor, that the ambient condition is not conducive to the first communication mode and that ambient condition is more conducive to the second communication mode than the first communication mode. A corresponding computer program product is also disclosed herein.

A corresponding computing apparatus includes a processor, one or more user I/O devices configured to provide a plurality of communication modes to a user, an ambient condition sensor configured to sense an ambient condition that is relevant to the plurality of communication modes, and a user interface module configured to deactivate a first communication mode of the plurality of communication modes and activate a second communication mode of the plurality of communication modes in response to determining, via the ambient condition sensor, that the ambient condition is not conducive to the first communication mode and that the ambient condition is more conducive to the second communication mode than the first communication mode.

DETAILED DESCRIPTION

The embodiments disclosed herein enable reliable user communication and power conservation under a wide variety of environmental conditions.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
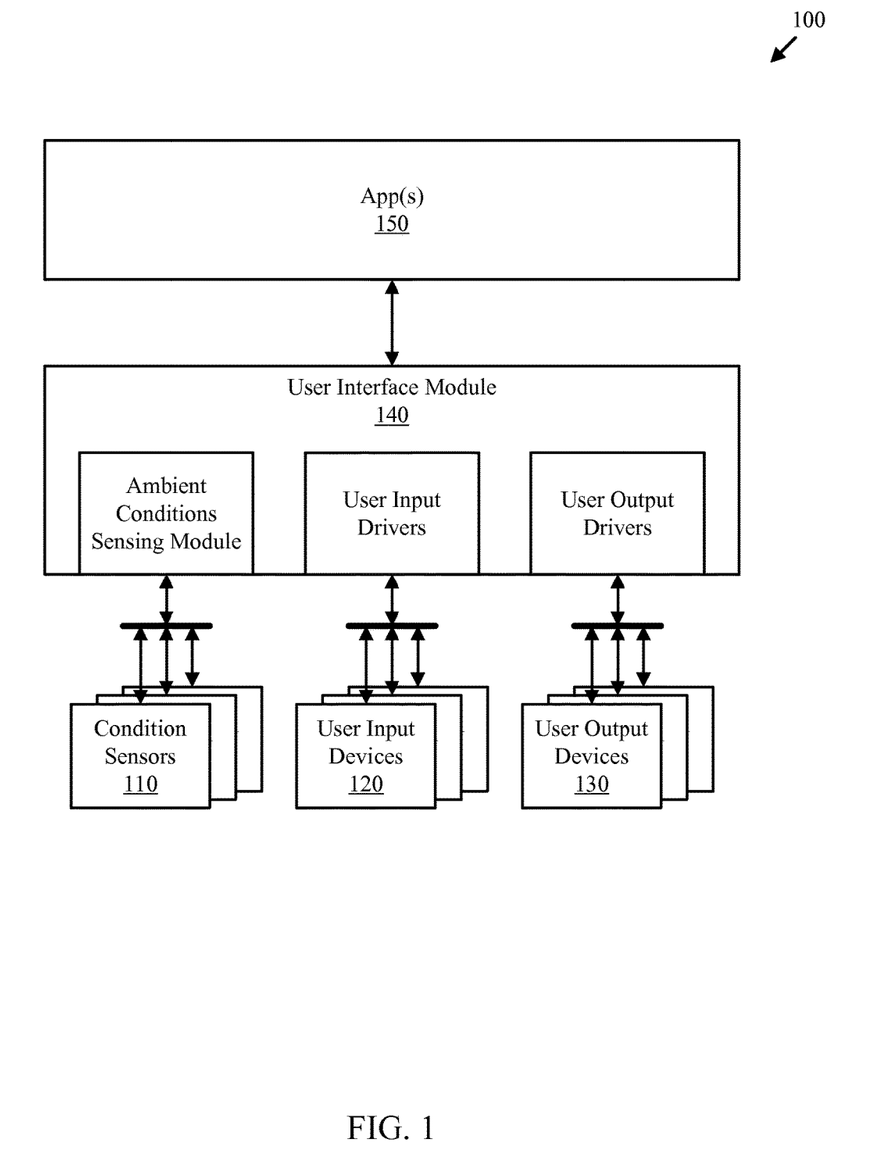
FIG. 1 is a block diagram of one embodiment of select portions of a wearable computing device in accordance with the present invention.
Figure 5:
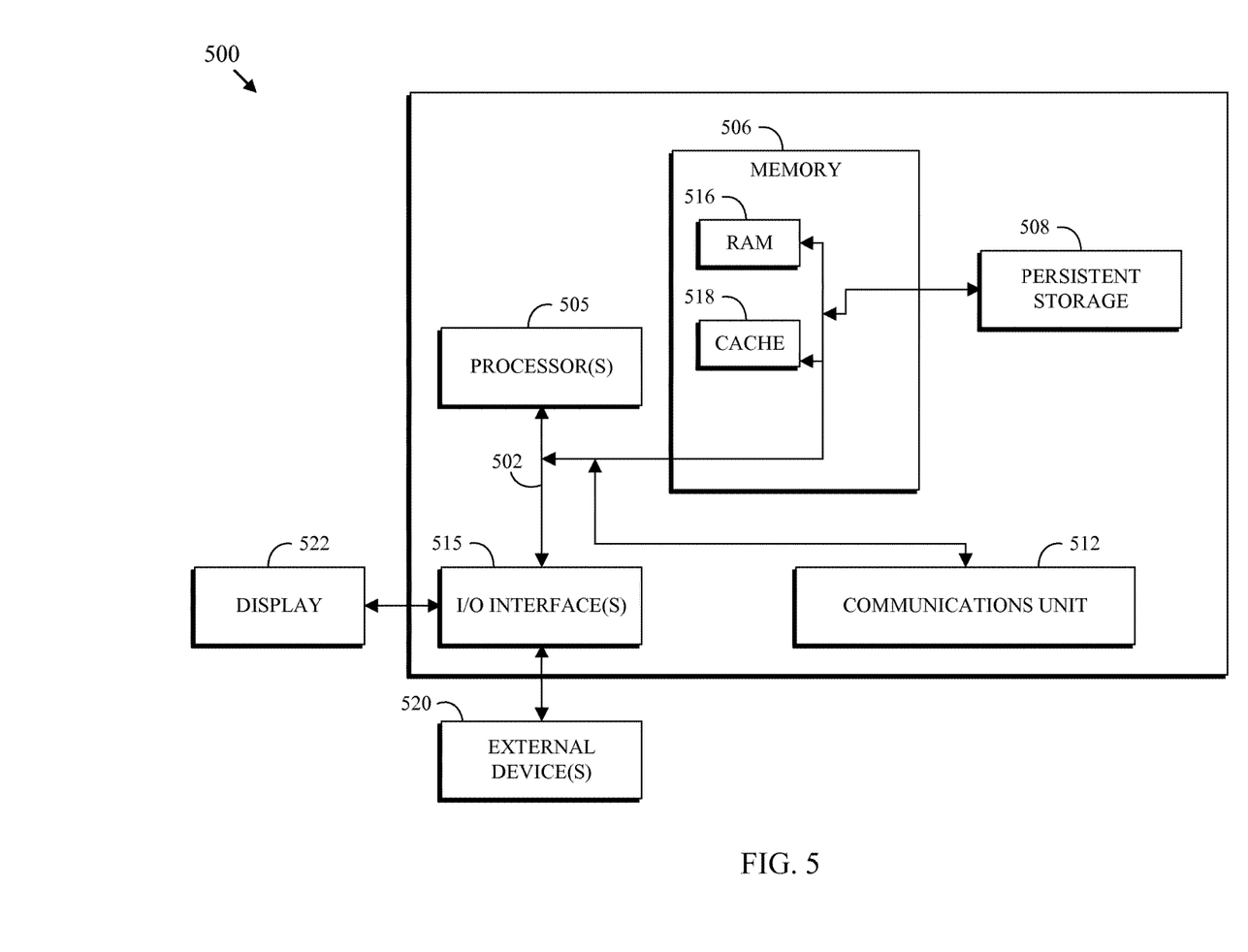
FIG. 5 is a block diagram depicting one example of a computing apparatus (i.e., computer) suitable for executing the methods disclosed herein.

User communications (e.g., interactions) with and through wearable computing devices are preferably reliable without consuming excessive levels of power. The embodiments disclosed herein monitor conditions in the ambient environment that are relevant to user communications, and switch communication modes when the ambient conditions are not conducive to the currently active communication modes. For example, FIG. 1 is a block diagram of one embodiment of select portions of a wearable computing device 100 in accordance with the present invention. As depicted, the wearable computing device 100 includes ambient condition sensors 110, user input devices 120, user output devices 130, a user interface module 140, and one or more apps 150. The wearable computing device 100 enables communication with a user, or between users in a wide variety of environments. In addition to the depicted elements, the wearable computing device may include one or more processors, memory, non-user I/O devices including network communication devices (e.g., WIFI) and storage devices, and the like. FIG. 5 and the associated description disclose additional elements that may be included in the wearable computing device 100.

The ambient condition sensors 110 sense conditions in the ambient environment that are relevant to communication and/or interaction with a user. For example, the ambient condition sensors 110 may include lighting sensors (e.g., photodiodes, photo-resistors, charge couple devices, and photovoltaic devices), motion sensors (e.g., an accelerometer), position sensors (e.g. GPS devices), noise and/or sound sensors (e.g., a microphone), weather sensors (e.g., a thermometer or humidity sensor), or the like.

The user input devices 120 and the user output devices 130 enable the user to send and receive information and interact with the wearable computing device 100. Examples of a user input device 120 include a camera, a keyboard, a touchpad, a touchscreen, and a microphone. Examples of a user output device 130 include a display, a vibrator, an audio jack, and a speaker. In some embodiments, a user input device 120 may also function as an ambient condition sensor 110. For example, a microphone could be used as a sound or noise sensor as well as a speech input device.

The user interface module 140 may control the communication modes with which a user communicates. The communication may occur via the user input devices 120 and the user output devices 130. Each device 120 or 130 may support one or more communication modes. For example, a display (or a portion thereof) may be used in a text display mode, a backlit text display mode, a graphics display mode and a video display mode. Consequently, the communication supported by the user interface module 140 may be multi-modal.

The user communication enabled by the user interface module 140 may be used to control, and interact with, the wearable computing device 100 and/or the applications 150 executing thereon. The ambient condition sensors 110 may enable the user interface module 140 to determine whether the current ambient conditions are conducive to various forms of visual communication, aural communication, and tactile communication (e.g., the various communication modes supported by the wearable computing device 100). If the conditions are unconducive, the user interface module 140 may switch to a better communication mode. In some embodiments, one or more of the ambient condition sensors 110 are deactivated by the user interface module 140 in response to a low battery condition.

The apps 150 may communicate with a user via the user interface module 140. For example, the apps 150 may receive commands and/or messages from the user, and provide messages, content, or information to the user via the user interface module 140. In some embodiments, one or more of the apps 150 enable communication between the user and other users (e.g., a user equipped with the device 100 with an app 150 executing thereon).

Figure 2:
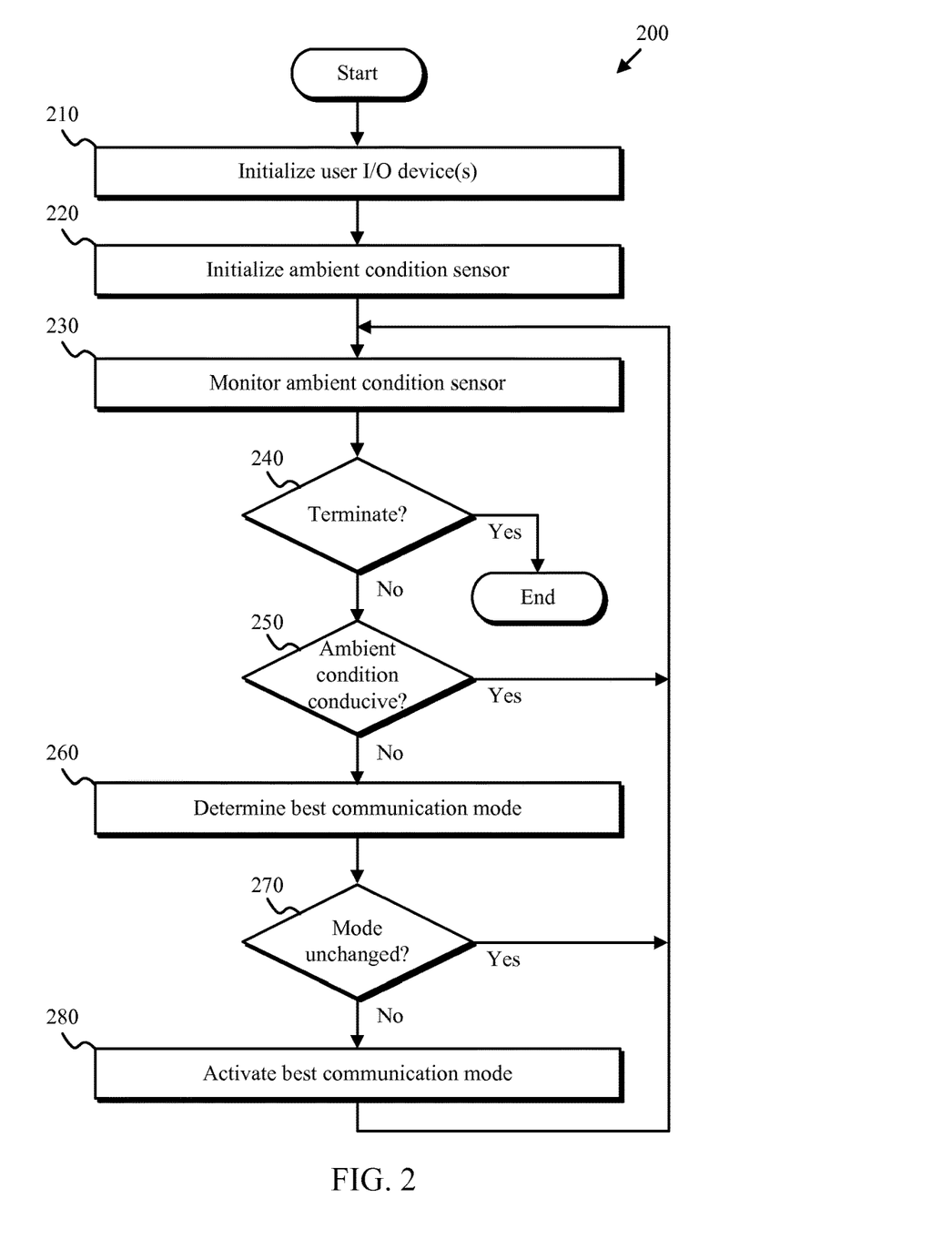
FIG. 2 is a flowchart of one embodiment of a communication control method in accordance with the present invention.

FIG. 2 is a flowchart of one embodiment of a communication control method 200 in accordance with the present invention. As depicted, the communication control method 200 includes initializing (210) one or more user I/O devices, initializing (220) an ambient condition sensor, monitoring (230) the ambient condition sensor, determining (240) whether to terminate, determining (250) whether the ambient condition is conducive, determining (260) the best communication mode, determining (270) whether the communication mode remains unchanged, and activating (280) the best communication mode. The communication control method 200 enables changing communication modes in response to one or more ambient conditions that are not conducive to a current utilized communication mode.

Initializing (210) one or more user I/O devices may include loading device drivers for the I/O devices. The device drivers may be responsive to activation and deactivation (e.g., by the user interface control module). Initializing (220) an ambient condition sensor may include calibrating the sensor for sensing a corresponding ambient condition.

Monitoring (230) the ambient condition sensor may include collecting and conditioning data from the ambient conditions sensor. Determining (240) whether to terminate may include determining whether a shutdown procedure or the like has been initiated.

Determining (250) whether the ambient condition is conducive may include comparing data provided by the ambient condition sensors against specific threshold values to provide a binary indication of whether the ambient condition is conducive the current communication mode(s). Alternately, the data provided by the ambient condition sensor may be processed to compute a score for the corresponding ambient condition.

Determining (260) the best communication mode may include determining which communication modes are conducive or most conducive to communication with the user under the ambient condition. Other factors besides ambient conditions (such as power consumption rate and available battery power) may be accounted for in determining the best communication mode. In some embodiments, the best communication mode is based on the preferences and/or capabilities of the user. For example, communications to a particular communication mode may be redirected to another communication mode based on a user preference, or in response to determining that the user is incapable of accurately communicating via the particular communication mode.

Determining (270) whether the communication mode remains unchanged may include comparing the previously active communication mode with the selected best communication mode. If the communication mode remains unchanged, the method loops to the monitoring operation 230. If the communication mode has changed, the method advances to activating (280) the best communication mode.

Activating (280) the best communication mode may include the user interface module informing the apps 150 and/or the drivers 144/146 (as depicted in FIG. 1) that a switch in communication modes has occurred and indicating which communication mode and corresponding user I/O devices are involved.

The above communication control method 200 was presented from the perspective of a single ambient condition sensor and corresponding ambient condition. However, the method 200 may be applied, or extended, to multiple ambient condition sensors and one or more corresponding ambient conditions.

Figure 3:
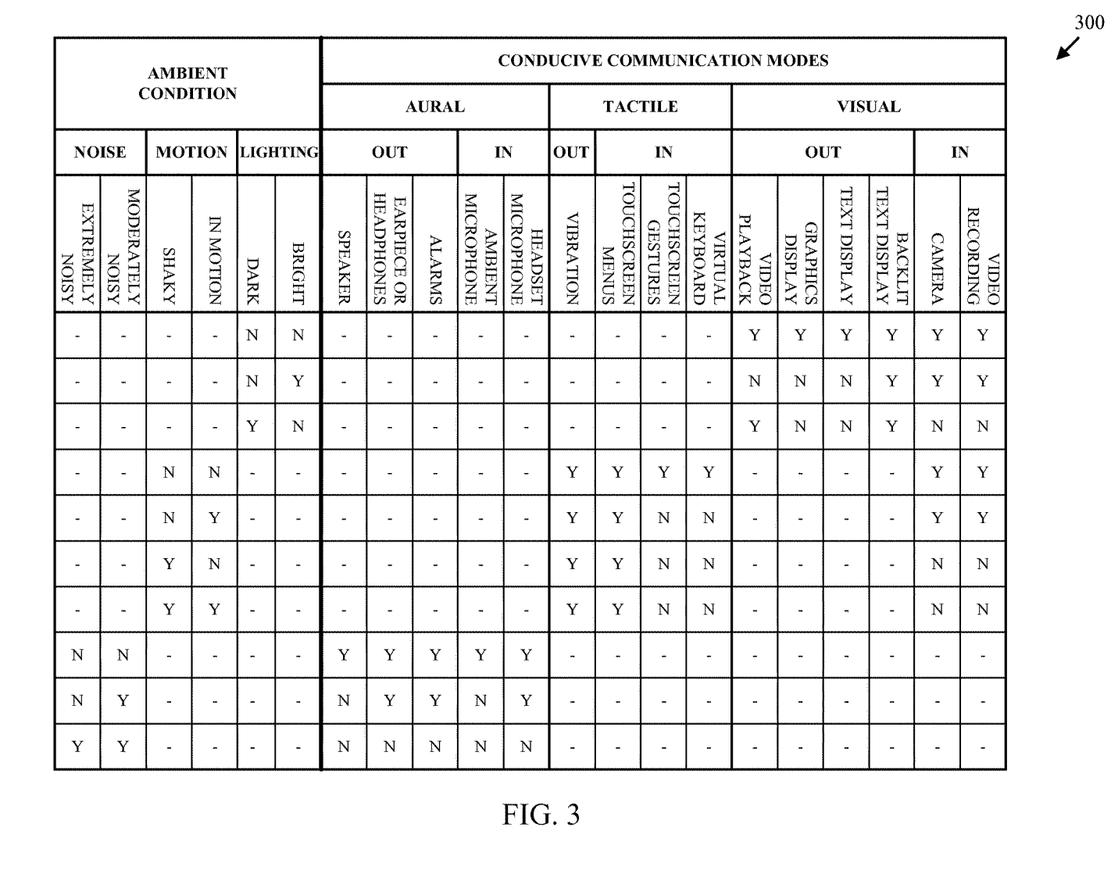
FIG. 3 is a relationship table that depicts one example of the relationship between ambient conditions and communication modes in accordance with at least one embodiment of the present invention.

FIG. 3 is a relationship table that depicts one example of a relationship 300 between various combinations of ambient conditions (shown on the left side of the table) and conducive communication modes (shown in the rest of the table) in accordance with at least one embodiment of the present invention. As depicted, the relationship 300 indicates which communication modes are conducive under various ambient conditions. In the depicted arrangement, each ambient condition may be compatible (i.e., marked with a 'Y'), incompatible (i.e., marked with a 'N'), or indifferent to (i.e., marked with a '-') a communication mode. For example, a 'shaky motion' ambient condition may not be conducive to capturing video or using touchscreen gestures and a 'moderately noisy' ambient condition may not be conducive to listening to audio through a speaker but may be conducive to listening to audio through an earpiece or headset.

One of skill in the art will appreciate that the conduciveness of various communication modes under various ambient conditions need not be binary (i.e., could be weighted) and may be application and device dependent. For example, user communication and/or interaction when using a spreadsheet application may be more sensitive than when playing a game and a speech recognition application may be less sensitive with a noise canceling headset microphone than with a conventional headset microphone. In some embodiments, the relationships between conducive communication modes and ambient conditions are (at least initially) determined by a manufacturer (e.g., via diagnostic tests). In other embodiments, the relationships are determined by user preferences.

Figure 4:
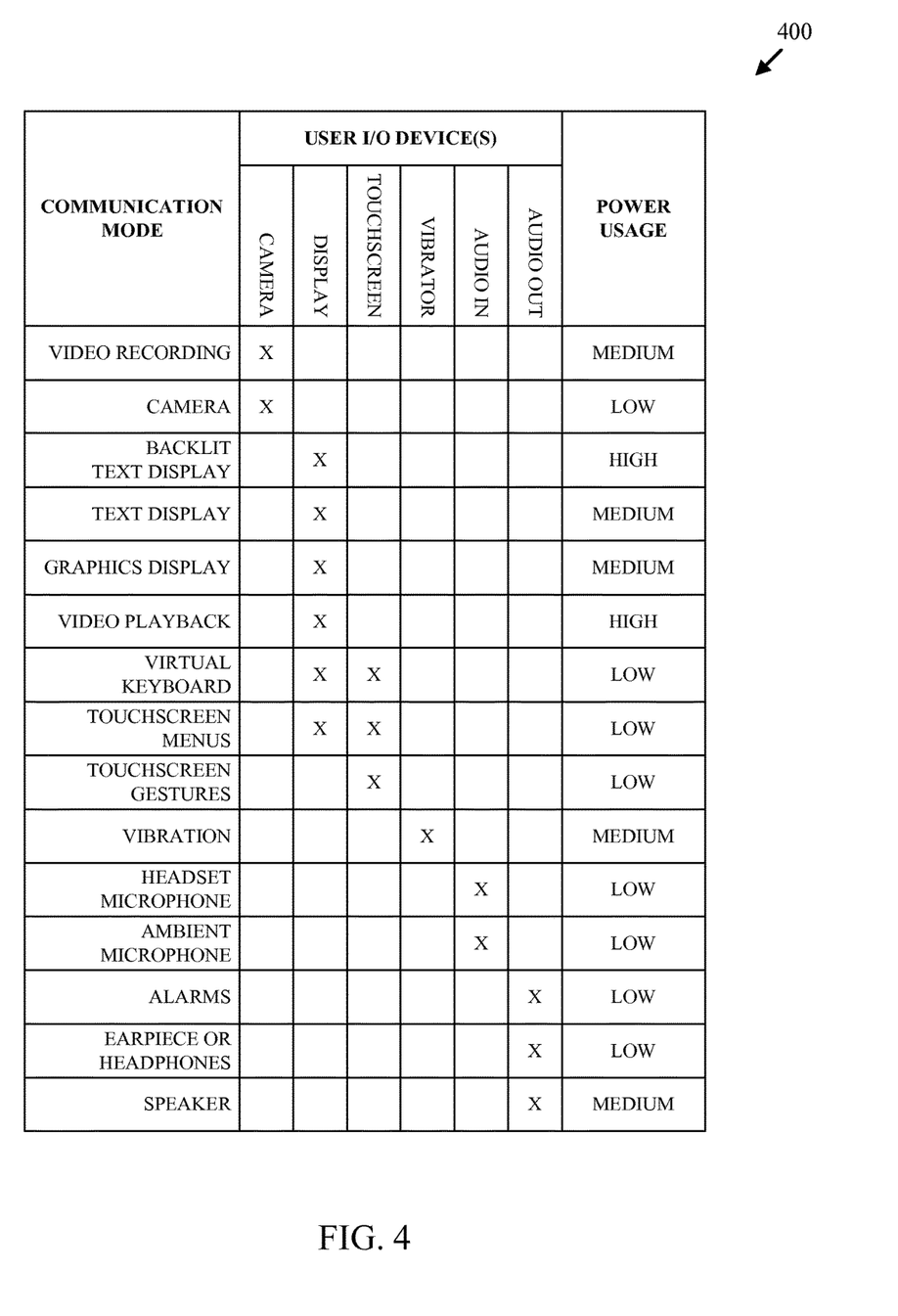
FIG. 4 is a relationship table that depicts one example of the relationship between communication modes, I/O devices, and power usage in accordance with at least one embodiment of the present invention.

FIG. 4 is a relationship table that depicts one example of a relationship 400 between communication modes, I/O devices, and power usage in accordance with at least one embodiment of the present invention. As depicted, the relationship 400 indicates which user I/O device is used for each communication mode and the relative amount of power usage. Each depicted user I/O device may correspond to a user input device 120 or user output device 130 and the associated drivers 144 or 146. As demonstrated with the example relationship 400, a single user I/O device may support multiple, or even many, communication modes. For example, the 'touchscreen' user I/O device listed in FIG. 4 supports two text output modes, a 'graphics display' mode, a 'video playback' mode, a 'virtual keyboard' mode, a 'touchscreen menus' mode, and a 'touchscreen gestures' mode. In one embodiment, the 'touchscreen menus' mode facilitates user communication in adverse conditions by providing 'canned' or 'programmable' responses that are sent by touching specific buttons graphically rendered on the touchscreen. While only three power usage levels (i.e., 'low', 'medium' and 'high') are shown in FIG. 4, higher resolution power usage levels may be used (e.g., microwatts). The power usage levels may enable reliable user communications with reduced levels of power consumption particularly higher resolution power usage levels are used.

The embodiments herein provide reliable communication to a user in a wide variety of environmental conditions by determining, via a set of ambient condition sensors, that one or more ambient conditions are not conducive to a currently active communication mode and that the current ambient conditions are more (or most) conducive to another communication mode. In response thereto, the disclosed embodiments deactivate the currently active communication mode activate the communication mode for which the current ambient conditions are more or most conducive. In selecting a more conducive communication mode, power consumption levels may be considered.

FIG. 5 is a block diagram depicting components of a computer 500 suitable for executing the methods disclosed herein. The computer 500 may be one embodiment of the wearable computing device 100 depicted in FIG. 1. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computing apparatus comprising:
a processor;
a memory module configured to contain a plurality of user preferences;

one or more user I/O devices configured to provide a plurality of input/output communication modes to a user;

an ambient condition sensor configured to sense an ambient condition that is relevant to the plurality of input/output communication modes; and a user interface module configured to:
determine, via the ambient condition sensor, based, at least in part, on the plurality of user preferences and battery power remaining of the computing apparatus, that the ambient condition is not conducive to a first input/output communication mode and that the ambient condition is more conducive to a second input/output communication mode, relative to the first input/output communication mode, and responsive to the determining that the ambient condition is not conducive, deactivate the first input/output communication mode of the plurality of input/output communication modes and activate the second input/output communication mode of the plurality of input/output communication modes;

wherein the plurality of user preferences includes a preferred input/output communication mode for at least one application.

2. The apparatus of claim 1, wherein the plurality of input communication modes include two or more of keyboard input, speech input, text input, and input gestures.

3. The apparatus of claim 1, wherein the user interface module is configured to inform the user of a change to a different input communication mode.

4. The apparatus of claim 1, wherein a user I/O device of the one or more user I/O devices is selected from the group consisting of a speaker, a microphone, an audio jack, a display, a touchpad, a touchscreen, and a vibrator.

5. The apparatus of claim 1, wherein the ambient condition sensor comprises a light sensor or an audio sensor.

6. The apparatus of claim 5, wherein the user interface module is configured to determine via the light sensor whether an ambient lighting condition is conducive to visual communication with the user.

7. The apparatus of claim 5, wherein the user interface module is configured to determine via the audio sensor whether an ambient sound condition is conducive to aural communication with the user.

8. A method, executed by one or more processors, the method comprising:
receiving a plurality of user preferences;
monitoring an ambient condition sensor configured to sense an ambient condition that is relevant to a plurality of input/output communication modes provided by at least one user I/O device;
determining, via the ambient condition sensor, based, at least in part, on the plurality of user preferences and battery power remaining of the computing apparatus, that the ambient condition is not conducive to a first input/output communication mode and that the ambient condition is more conducive to a second input/output communication mode, relative to the first input/output communication mode, and
responsive to the determining that the ambient condition is not conducive, deactivating the first input/output communication mode of the plurality of input/output communication modes and activating the second input/output communication mode of the plurality of input/output communication modes;
wherein the plurality of user preferences includes a preferred input/output communication mode for at least one application.

9. The method of claim 8, wherein the plurality of communication modes are selected from the group consisting of keyboard input, speech input, speech output, audio output, text input, displaying text, video or camera input, video output, input gestures, and canned responses.

10. The method of claim 8, further comprising informing the user of a change to a different communication mode.

11. The method of claim 8, further comprising determining, via a light sensor, whether an ambient lighting condition is conducive to visual communication to the user.

12. The method of claim 8, further comprising determining, via the audio sensor, whether an ambient sound condition is conducive to aural communication to the user.

13. A computer program product (CPP) comprising:
one or more computer readable storage media;
program instructions stored on the one or more computer readable storage media, the program instructions comprising instructions for causing one or more processors to perform operations including the following:
receiving a plurality of user preferences,
monitoring an ambient condition sensor configured to sense an ambient condition that is relevant to a plurality of communication input/output modes provided by at least one user I/O device,
determining, via the ambient condition sensor, based, at least in part, on the plurality of user preferences and battery power remaining of the computing apparatus, that the ambient condition is not conducive to a first input/output communication mode and that the ambient condition is more conducive to a second input/output communication mode, relative to the first input/output communication mode, and
responsive to the determining that the ambient condition is not conducive, deactivating the first input/output communication mode of the plurality of input/output communication modes and activating the second input/output communication mode of the plurality of input/output communication modes;
wherein the plurality of user preferences includes a preferred input/output communication mode for at least one application.

14. The computer program product of claim 13, wherein the plurality of communication modes are selected from the group consisting of speech input, speech output, audio output, text input, displaying text, video or camera input, video output, input gestures, and canned responses.

15. The computer program product of claim 13, wherein the program instructions comprise instructions to determine, via a light sensor, whether an ambient lighting condition is conducive to visual communication to the user.

16. The computer program product of claim 13, wherein the program instructions comprise instructions to determine, via the audio sensor, whether an ambient sound condition is conducive to aural communication to the user.

17. The computer program product of claim 13, wherein the program instructions comprise instructions to inform the user of a change to a different communication mode.

* * * * *